Sept. 9, 1952  H. SWANSON  2,610,077
PENCIL COUPLING
Filed June 24, 1947
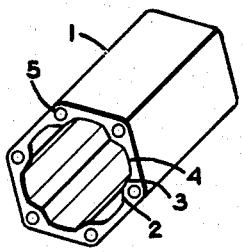
Fig. 1
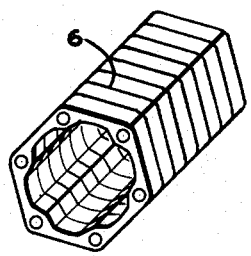
Fig. 2
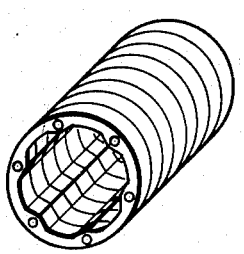
Fig. 3
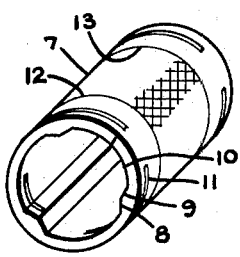
Fig. 4
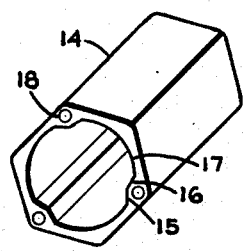
Fig. 5
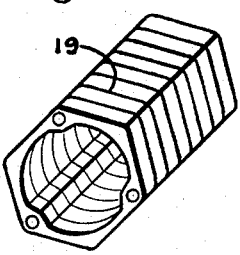
Fig. 6
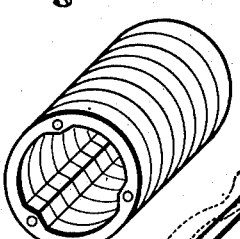
Fig. 7
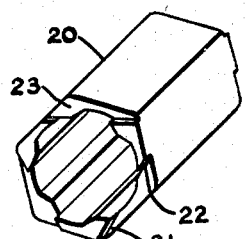
Fig. 8
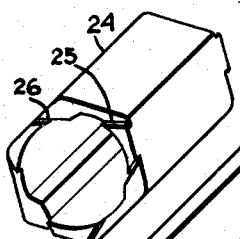
Fig. 9
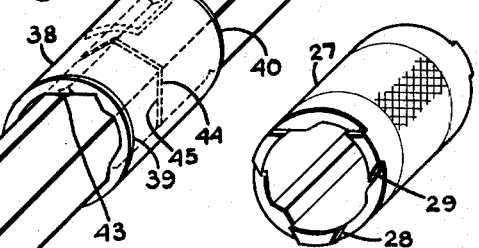
Fig. 10
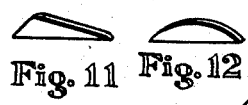
Fig. 11  Fig. 12
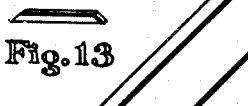
Fig. 13
Fig. 15  Fig. 16
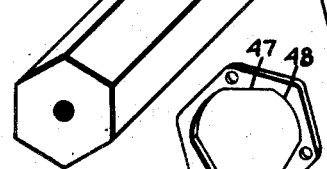
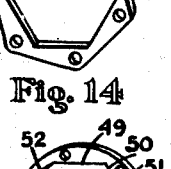
Fig. 17  Fig. 14
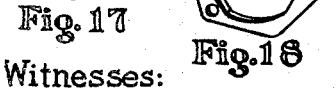
Fig. 18  Fig. 19  Fig. 20  Fig. 21  Fig. 22
Witnesses:
Hubert Hilston
Gustave W. Hilston
Inventor
Harold Swanson

UNITED STATES PATENT OFFICE 2,610,077

PENCIL COUPLING

Harold Swanson, Brownhelm Township, Lorain County, Ohio

Application June 24, 1947, Serial No. 756,588

8 Claims. (Cl. 287—114)

This invention relates to improvements in pencil couplings which holds or fastens two pencils or similar articles together, but more particularly to pencil couplings which holds or fastens two lengths of hexagonal drawing pencils together.

One object of this invention is to show a practical means of constructing a simple and reliable pencil coupling which holds or fastens two pieces or lengths of standard type hexagonal drawing pencils together. Each pencil is fastened into the ends of the pencil coupling by a bayonet lock like action similar to the Pencil Lengthener and Holder invention of James P. Kusa, Patent 2,049,810, issued August 4, 1936, which permits a pencil to be freely inserted, then rotated against gripping teeth to a positive stop to hold and stop the pencil therein by its hexagonal ridges.

A further object is that when two short lengths of drawing pencils are fastened together with this pencil coupling, their combined length is long enough to be held in a person's hand, whereas each individual length of pencil is just a little too short to be held in one's hand while drawing, writing, marking, etc. with it. It is well known in the art that when a pencil is repeatedly sharpened and worn down to a short length, such pencil becomes difficult to hold in the hand; also that such short pencil can be placed within a commercial pencil extension holder and used until it is less than one inch long before discarding. Now with the pencil coupling of this invention, such short length pencil can be coupled or fastened to a new full length pencil, or two short length pencils can be connected together to make a length which is convenient to hold in the hand.

A further object is that when two lengths of pencils are coupled together with this pencil coupling, each length acts as a pencil extension holder for the other length of pencil so that the combined length is readily held in a person's hand to draw, write, print, etc.

A further object is that the pencil coupling of this invention can be made to any practical length to suit popular demand, which in some instances may be only one-fourth inch (¼") long or even less. In some cases when the wood of the pencil is firm, only one-sixteenth inch (1/16") length is required for this pencil coupling to get a grip or bite on the square cut end of a stub pencil.

A further object is that any pencil coupling of this invention can be made long enough to act as a pencil extension holder which is convenient to hold in the hand.

A further object is that in the pencil couplings of this invention, each piece or length of pencil is individually gripped in the pencil coupling entirely independent from the other pencil therein.

A further object of this invention is that the pencil coupling shall be tubular in form to slip on or over the pencils from their ends and act as a sleeve around the pencils for suitable lengths.

A further object is that any pencil coupling of this invention shall consist of at least three or more parts that are fastened together, the main part being a sleeve or tube-like section to slip on or over the ends of two pencils, and the other two parts being thin plates attached to the main part that grip or bite into the ridges or flutes of said pencils as each is independently rotated a fraction of a revolution within the pencil coupling. In some pencil couplings the sleeve or tube is made laminated from thin punchings that are riveted or fastened together to form a sleeve or tube (main part), while in other pencil couplings the grip plates are each made with several segments; however when they are fastened together they function as single units.

A further object is that the pencil couplings shall have internal stop flutes extending from end to end or to any suitable length within the sleeve or tube (main part) which permits a pencil to be inserted therein and rotated only a fraction of a revolution between said stop flutes.

A further object is that the pencil coupling shall have thin plates which are positioned and fastened to the sleeve or tube (main part) at suitable locations so that they are forced into and grip the wood ridges or flutes of a pencil as it is rotated between the internal stop flutes within the sleeve or tube (main part).

A further object is that the pencil coupling sleeve or tube (main part) can be made with one, two, three, four, five, or six internal stop flutes; however only three and six are shown in the illustrations because they provide a better balance grip and stop for an hexagonal pencil inserted therein.

A further object is that the pencil coupling grip plates can be made with one, two, three, four, five, or six gripping edges to suit the sleeve or tube (main part); however only three, four and six are shown in the illustrations as they provide a better balance grip for an hexagonal pencil.

A further object is that the pencil coupling can be made for either right hand or left hand rotation to hold two pencils together, by locating the gripping edges of the grip plates to the right or the left of the internal stop flutes within the sleeve or tube (main part); also each end of the coupling can be made to grip its pencil with the opposite hand rotation from that rotation of the other end.

A further object is that when the pencil coupling is made to hold the pencils with opposite hand rotation from each other as observed from one end only, then the two pencils can be tightened in the pencil coupling by twisting the pencils in the hands, like one wrings a wet cloth, without holding the coupling or even touching the pencil coupling after once setting it at the junction of the two pencils.

A further object is that the thin grip plates of the pencil coupling are made so thin that they cut or bit into the flutes or ridges of the pencils with a sort of dull knife-like action to grip or hold each pencil as it is rotated therein; if the plate is too thin it cuts the wood, whereas it must compress or deform the wood so that its natural resilience presses back against the grip plates with enough friction to hold the pencils tight; also the indentations made in the pencil flutes or ridges by the grip plates acts like a bayonet lock to hold the pencil from being pulled out of the pencil coupling lengthwise.

A further object is that the thin grip plates of the pencil coupling can be so located in relation to the internal stop flutes that a slight rotational overtravel is made before the flutes or ridges of the pencil contact the internal stop flutes of the sleeve or tube (main part). For example if the stop flutes were not present, the pencil could be rotated completely around within the pencil coupling, and the torsion required to turn such pencil around would be the greatest at the shortest radial distance on the gripping edge of the grip plates and diminishes both ways from such a point as the indentations on the flutes or ridges on the pencil rotate thereby; now the slight rotational overtravel is the amount of rotation that the internal stop flutes permits the pencil to rotate beyond the point of the greatest torsion required to turn the pencil. This overtravel makes it necessary to exert greater twisting or wringing action to remove a pencil from the pencil coupling and prevents the pencils from coming apart from ordinary vibration. This overtravel feature is desirable when using a short pencil to draw, write, print, etc. and is not built into the commercial pencil extension holders.

A further object is that the outside diameter of the pencil coupling can be made round, hexagonal, or any other fluted shape. The fluted shape prevents the pencils from rolling on slightly inclined drafting boards.

A further object is that the pencil coupling can have a vest pocket clip attached thereto for the convenience of carrying the pencils about on a person. This clip also prevents the pencils from rolling on inclined surfaces.

A further object is that in a pencil coupling of this invention the outer edge of the grip plates shall conform to the outer surface of the sleeve or tube (main part); i. e. when the sleeve or tube (main part) is made hexagonal on its outside diameter, then the outer edges of the grip plates are made hexagonal to match the sleeve or tube (main part).

A further object is that the pencil coupling of this invention can be made to grip two pencils at several intervals along its length, even along its entire length if desired, by making the sleeve or tube (main part) built up into a stack of punchings with grip plate punchings between the sleeve punchings and riveting or otherwise fastening the whole stack together to form a laminated pencil coupling.

Other objects of this invention will appear more fully described and illustrated hereinafter.

While it is practical to adapt the improvements of this invention to many pencil couplings, the present Patent Office Regulations restrict the claims that are allowed in a single patent which illustrates more than five types. In the accompanying description and drawing I have illustrated and described several styles of pencil coupling parts to show that I have not overlooked the possibilities of many variations to apply these improvements. The feature which is common or generic to all types described or shown, is, the combination in a pencil coupling, of, a sleeve or tube having internal flutes which slips over the end of a fluted pencil and permits said pencil to rotate a fraction of a revolution between said internal flutes that act as stops to limit the rotation against the flutes of said pencil, and at least one thin plate attached at or near the end of said sleeve in a position to grip or bite into one or more flutes of said pencil as it is rotated therein. Around the feature of said combination this invention becomes apparent by the following in which:

Fig. 1 to Fig. 10, Fig. 15 and Fig. 16 are enlarged perspective views of pencil coupling sleeves.

Fig. 11, Fig. 12 and Fig. 13 are enlarged perspective views of segmental grip plates.

Fig. 14, Fig. 18 to Fig. 22 are enlarged perspective views of end ring grip plates.

Fig. 17 is an enlarged perspective view of a pencil coupling holding or fastening two pencils together. The ends of the pencils within the pencil coupling are shown in dotted lines. Also shown is a vest pocket clip attached to the pencil coupling.

Fig. 1 shows an enlarged perspective view of a pencil coupling sleeve; comprising a short length of hexagonal brass or other suitable material tubing 1, having its inside broached, extruded, or otherwise formed with six stop flutes with two ridge faces on each as shown at 2 and 3, that extend from end to end of tubing 1, and having six peripheral surfaces each as shown at 4, that also extend from end to end of tubing 1 between said stop flutes 2 and 3; six riveting or fastening holes are drilled or otherwise formed through the tubing 1 each like shown at 5. The inside diameter at the ridges or apexes between the ridge faces 2 and 3, is made large enough to slip over the flat faces of an hexagonal pencil, while the diameter at the six intermediate surfaces 4, is made large enough to slip over the ridges of said pencil, and permits said pencil to be rotated approximately only thirty degrees (30°) between said six stop flutes 2 and 3. The ideal angle at the apexes of the six stop flutes is one-hundred-twenty degrees (120°); however the angle can be made larger or smaller. The six stop flutes 2 and 3 can be made half round or most any other shape if desired; however the shape as shown fits more ideally to the flats of an hexagonal pencil which is one-hundred-twenty degrees (120°). The outside ridges, flutes, or corners of the hexagonal tubing 1, can be slightly rounded or broken so as not to cut one's fingers when twisting or holding the pencil coupling in the hands.

Fig. 2 shows an enlarged perspective view of a pencil coupling sleeve; comprising a built up stack of punchings, stampings, or laminations as shown at 6, having the same cross-section as tubing 1, in Fig. 1, all riveted or fastened together later with grip plates (similar to Fig. 14) on each end.

Fig. 3 shows an enlarged perspective view of a pencil coupling sleeve; comprising a stack of laminations made similar to Fig. 2, except the outside diameter is round whereas Fig. 2 is hexagonal. The riveting holes are shown slightly smaller than those shown in Fig. 2 and Fig. 1 at 5. The outside diameter of the laminations in the stack can be knurled, milled or serrated to provide hand gripping surfaces when the pencil coupling is twisted to a pencil in one's hands. The stack is first riveted or fastened together with three pins each in every other hole; later the entire stack with grip plates (similar to Fig. 20) on each end is again riveted or fastened together with three additional pins through the remaining holes matching the holes in the end grip plates.

Fig. 4 shows an enlarged perspective view of a pencil coupling sleeve; comprising a short length of round brass or other suitable material tubing 7, having its inside broached, extruded or otherwise formed with three stop flutes, each with two ridge faces as shown at 8 and 9, that extend from end to end of tubing 7, and having three peripheral surfaces each as shown at 10, that also extend from end to end of tubing 7 between said stop flutes 8 and 9; and having near each end in tubing 7, three sawed, milled or otherwise formed slots each as shown at 11, six in all, which are formed to fit grip plates (similar to Fig. 12) arranged so that when viewed from one end the hole through tubing 7 appears as the large center hole in Fig. 21; later the six grip plates (similar to Fig. 12) are soldered or otherwise fastened in tubing 7; and having the outside diameter of tubing 7 knurled, milled or serrated between lines 12 and 13 or to any length desired to provide a hand gripping surface when the pencil coupling is twisted to a pencil in one's hand. The inside diameter at the ridges or apexes between the ridge faces 8 and 9, and also the diameter of the three peripheral surfaces 10 are made to fit an hexagonal pencil with approximately thirty degrees (30°) rotation similar to Fig. 1. It is obvious that the stop flutes 8 and 9 are the same as 2 and 3 in Fig. 1.

Fig. 5 shows an enlarged perspective view of a pencil coupling sleeve; comprising a short length of hexagonal brass or other suitable material tubing 14, having its inside broached, extruded, or otherwise formed with three stop flutes, each with two ridge faces as shown at 15 and 16, that extend from end to end of tubing 14, and having three peripheral surfaces each as shown at 17, that also extend from end to end of tubing 14 between said stop flutes 15 and 16; three riveting or fastening holes are drilled or otherwise formed through the tubing 14 as shown at 18. The inside diameter at the ridges or apexes between the ridge faces 15 and 16, is made large enough to slip over the flat faces of an hexagonal pencil, while the diameter at the three intermediate surfaces 17, is made large enough to slip over the ridges of said pencil, and permits said pencil to be rotated approximately only thirty degrees (30°) of a revolution between said three stop flutes 15 and 16. The ideal angle at the apexes of the three stop flutes is one-hundred-twenty degrees (120°); however it can be made to any suitable or desired angle. The three stop flutes 15 and 16 can be made half round or most any other suitable shape; however the shape as shown fits more ideally to the flats of an hexagonal pencil which is one-hundred-twenty degrees (120°). The outside ridges, flutes or corners of the hexagonal tubing 14, can be slightly rounded or broken so as not to cut one's fingers when twisting or holding the pencil coupling in the hands.

Fig. 6 shows an enlarged perspective view of a pencil coupling sleeve; comprising a built up stack of punchings, stampings, or laminations as shown at 19, having the same cross-section as tubing 14, in Fig. 5, all riveted or fastened together later with grip plates (similar to Fig. 18) on each end.

Fig. 7 shows an enlarged perspective view of a pencil coupling sleeve; comprising a stack of laminations made similar to Fig. 6, except the outside diameter is round whereas Fig. 6 is hexagonal. The riveting holes are shown slightly smaller than those shown in Fig. 6 and Fig. 5 at 18. The outside diameter of the laminations in the stack can be knurled, milled or serrated to provide hand gripping surfaces when the pencil coupling is twisted to a pencil in one's hands. The entire stack is later riveted or fastened together with grip plates (similar to Fig. 21) on each end.

Fig. 8 shows an enlarged perspective view of a pencil coupling sleeve; comprising a tubing 20 made similar to Fig. 1, except that the holes 5 are eliminated; having each end of tubing 20 milled or otherwise formed with three grip plate cuts 21 and 22 as the bottom of the same, six in all, which are cut or formed to fit grip plates (similar to Fig. 11) arranged so that from one end the hole through tubing 20 appears like the large center hole in Fig. 19, when the grip plates are later soldered or otherwise fastened therein against the end faces 23.

Fig. 9 shows an enlarged perspective view of a pencil coupling sleeve; comprising a tubing 24 made similar to Fig. 5, except that the holes 18 are eliminated; having each end of tubing 24 formed with three grip plate cuts 25 and 26 as the bottom of the same, six in all, which are made similar to the cuts in Fig. 8 at 21 and 22, to fit grip plates (similar to Fig. 11) arranged so that from one end the hole through tubing 24 appears like the large center hole in Fig. 18, when the grip plates are later soldered or otherwise fastened therein.

Fig. 10 shows an enlarged perspective view of a pencil coupling sleeve; comprising a tubing 27 made similar to Fig. 4, except that the sawed slots 11 are eliminated; having each end of tubing 27 milled or otherwise formed with three grip plate cuts 28 and 29 as the bottom of the same, six in all, which are cut or formed to fit grip plates (similar to Fig. 12), arranged so that from one end the hole through tubing 27 appears like the large center hole in Fig. 21, when the grip plates are later soldered or otherwise fastened therein.

Fig. 11 shows an enlarged perspective view of a pencil coupling segmental grip plate; comprising a thin plate of hardened steel or other suitable metal which is made to fit the end cuts in Fig. 8 or Fig. 9 at 21 and 22 or 25 and 26 respectively, and later soldered or otherwise fastened therein.

Fig. 12 shows an enlarged perspective view of a pencil coupling segmental grip plate; comprising a thin plate of hardened steel or other suitable metal which is made to fit into the sawed slots in Fig. 4 at 11, or the end cuts in Fig. 10 or Fig. 15 at 28 and 29 or 32 and 33 respectively, and later soldered or otherwise fastened therein.

Fig. 13 shows an enlarged perspective view of a pencil coupling segmental grip plate; comprising a thin plate of hardened steel or other suitable metal which is made to fit the end slot cuts in Fig. 16 at 35, 36, and 37, and later soldered or otherwise fastened therein.

Fig. 14 shows an enlarged perspective view of a pencil coupling end ring grip plate; comprising a thin plate or washer of hardened steel or other suitable metal which is made hexagonal to fit the outside end of tubing 1 in Fig. 1, and having an hexagonal hole 30 therein which is rotated approximately fifteen degrees (15°) from the outer hexagonal edges as shown; riveting holes are drilled or otherwise formed through the washer to match the six holes at 5 in Fig. 1; hexagonal hole 30 is made large enough to just slip over an hexagonal pencil. This grip plate is later riveted or fastened to each end of a pencil coupling sleeve (similar to Fig. 1 or Fig. 2).

Fig. 15 shows an enlarged perspective view of a pencil coupling sleeve; comprising a tubing 31 made similar to Fig. 10, except that the inside hole through tubing 31 is like the inside hole through tubing 1 in Fig. 1, and having end grip plate cuts 32 and 33 arranged like 28 and 29 in Fig. 10 to fit Fig. 12 so that from one end the hole through tubing 31 appears like the large center hole in Fig. 19, when the grip plates are later soldered or otherwise fastened therein.

Fig. 16 shows an enlarged perspective view of a pencil coupling sleeve; comprising a tubing 34 made similar to Fig. 15, except that the end cuts 32 and 33 are modified to heel in the end grip plates; having tubing 34 formed with six grip plate cuts as shown at 35, 36, and 37 to fit grip plates (similar to Fig. 13) arranged so that from one end the hole through tubing 34 appears like the large center hole in Fig. 19, when the grip plates are later soldered or otherwise fastened therein, and heels against the edges at 37.

Fig. 17 shows an enlarged perspective view of a pencil coupling holding or fastening two pencils together; comprising a pencil coupling sleeve 38 similar to Fig. 7 with end ring grip plates 39 and 40 similar to Fig. 19 but with only three riveting holes to match Fig. 7 that are riveted or fastened thereto; a short length and a long length of regular hexagonal drawing pencils 41 and 42 are each inserted into the pencil coupling and twisted or turned by hand so as to cause the grip plates 39 and 40 to be forced into the ridges or flutes of each pencil 41 or 42 as shown at 43 to hold the pencils like a bayonet lock; the square cut ends of the pencils 41 and 42 are shown at 44 and 45; also shown is a vest pocket clip 46 which can be soldered or otherwise fastened to the tubing or sleeve 38, which acts as a stop to prevent rolling of the pencils on slightly inclined surfaces. While the pencils themselves are not part of the invention, yet they become the main objects upon which the pencil couplings are founded, and when they are all assembled together as shown, they function as an integral unit in one's hand to draw, write, etc.

Fig. 18 shows an enlarged perspective view of a pencil coupling end ring grip plate; comprising a thin plate or washer of hardened steel or other suitable metal which is made hexagonal to fit the outside end of tubing 14 in Fig. 5, and having a large center hole with three chordal edges 47 and three peripheral edges 48 of sixty degrees (60°) each, that is rotated approximately fifteen degrees (15°) from the outer hexagonal edges as shown; riveting holes are drilled or otherwise formed through the washer to match the three holes 18 in Fig. 5; the large center hole is made large enough to just slip over an hexagonal pencil. This grip plate is later riveted or fastened to each end of a pencil coupling sleeve (similar to Fig. 5 or Fig. 6). It is obvious that the chordal edges 47 are the same length as the hexagonal edges 30 in Fig. 14, and in the same relation to the outer hexagonal edges of the washers.

Fig. 19 shows an enlarged perspective view of a pencil coupling end ring grip plate; comprising a thin plate or washer of hardened steel or other suitable metal made round on the outer edge to fit Fig. 3, and having a large center hole with three chordal edges 49 of sixty degrees (60°) each, and three stop edges 50 and 51 that are similar to 15 and 16 in Fig. 5, and three peripheral edges 52 of thirty degrees (30°) each; riveting holes are drilled or otherwise formed through the washer to match the six holes in Fig. 3; the large center hole is made large enough to just slip over an hexagonal pencil. This grip plate is later riveted or fastened to each end of a pencil coupling sleeve (similar to Fig. 3). It is obvious that chordal edges 49 are the same length as the hexagonal edges 30 in Fig. 14; also the stop edges 50 and 51 are of fifteen degrees (15°) each.

Fig. 20 shows an enlarged perspective view of a pencil coupling and ring grip plate; comprising a thin plate or washer of hardened steel or other suitable metal made round on the outer edge to fit Fig. 7, and having a large center hexagonal hole 53 that is the same as hole 30 in Fig. 14; riveting holes are drilled or otherwise formed through the washer to match the three holes in Fig. 7. This grip plate is later riveted or fastened to each end of a pencil coupling sleeve (similar to Fig. 7 or Fig. 3).

Fig. 21 shows an enlarged perspective view of a pencil coupling end ring grip plate; comprising a washer made similar to Fig. 20, except that the large center hole is made like the hole in Fig. 18. This grip plate is later riveted or fastened to each end of a pencil coupling sleeve (similar to Fig. 7 or Fig. 3).

Fig. 22 shows an enlarged perspective view of a pencil coupling end ring grip plate; comprising a thin plate or washer of hardened steel or other suitable metal which is round on the outer edge, and having a large center hole with four chordal edges 54 and two peripheral edges 55 of sixty degrees (60°) each; riveting holes are drilled or otherwise formed through the washer to match four of the six holes in Fig. 3. This grip plate is later riveted or fastened to each end of a pencil coupling sleeve (similar to Fig. 3). It is obvious that the chordal edges 54 are the same length as the hexagonal edges 30 in Fig. 14.

In Fig. 14, and Fig. 18 to Fig. 22, which are end ring grip plates, the chordal edges of the large center holes therein, are the gripping edges which are forced into the wooden flutes or ridges of an hexagonal pencil to form a sort of bayonet lock therewith. An end ring grip plate can be made with any number up to six of such chordal edges, also in some cases it requires only one gripping edge to hold a pencil in the pencil coupling. When less than six of such chordal edges are made therein, the remaining edges of the large center hole between the chordal edges can be radial or any other form, just so that it permits an hexagonal pencil to be inserted therein and rotated to the gripping position of the chordal edges. The end ring grip plates can be fastened to the pencil coupling sleeves (Fig. 1 to Fig. 10, Fig. 15 and Fig. 16) by soldering, brazing, welding, dowels, screws or rivets. When the grip plates are made of hardened steel, they last much longer than those made from hard copper alloys.

In Fig. 1 to Fig. 10, Fig. 15 and Fig. 16, which are pencil coupling sleeves, the internal stop flutes extend from end to end, however they can be made to any suitable length therein; also the riveting or fastening holes can be made to any suitable depth therein.

In several of the pencil couplings illustrated herein, it is possible to cut the pencil coupling in halves and fasten a long tube between the halves, which then can be used as a double end pencil extension holder. It is also obvious that these pencil couplings can be made to such a long length that they can be used as a double end pencil extension holder, as the grip plates can grip the pencil at any place along its entire length.

In Fig. 2, Fig. 3, Fig. 6, and Fig. 7, the pencil coupling sleeves are built up into a stack from laminations; with such construction it is possible to place the end grip plates (Fig. 14, Fig. 18 to Fig. 22) between the laminations in as many places as desired to provide greater gripping length on the pencils held therein, even up to the full length of the coupling if required for some particular application.

The pencil coupling sleeves can also be made from plastic material as well as metal. It would also be practical to mould the hardened steel grip plates integral with the coupling sleeve when it is made of low fusing metal alloy or moulded plastic with the riveting pins acting as reinforcement bars therein.

If pencils were made triangular, square, pentagon, or any other fluted shape, these pencil couplings could be made relatively similar to accommodate such pencil just like they now fit the hexagonal pencil. In other words the hexagonal pencil is the commonly accepted form that suits the commercial trade, but if another fluted form of pencil should be marketed, then the pencil coupling of this invention could be modified to suit such pencil and still retain the features described herein.

A further object of this invention is that any pencil coupling sleeve, and any end ring grip plate, can be made to any outside or inside form that is described herein; for example in Fig. 19 the inside form shown could be made with an hexagonal outside form.

In the description of the pencil couplings shown herein, it is obvious that the sequence of building operations described can be changed without materially altering the finished pencil coupling; also some parts of one pencil coupling can be substituted for a similar part in another pencil coupling; therefore a further object of this invention, is that each part or each feature of that part which can be used with another part or feature shown or described herein, shall be an improvement of this invention.

In view of the drawing and preceding description, it is obvious that the improvements of this invention can be used to make many more pencil couplings other than those pencil couplings shown or described herein; also these pencil couplings can be used to couple other articels together besides pencils, such as thin wall metal tubing, fishing poles, tinker toys, ends of clothes line having rigid plastic moulded tips thereon, canes, cane handles, umbrella parts, hand flag poles, fountain pen caps, pencil eraser caps, and many other small articles too numerous to mention; therefore in anticipation of the manufacture of such couplings, it is a further object of this invention to extend the claims to include any coupling which uses one or more of the improvements shown, described, or claimed herein.

I claim:

1. A pencil coupling for connecting in axial alignment two hexagonal pencils, consisting of, a tubular sleeve having internal stop flutes extending from end to end thereof, two grip plates attached to the ends of said sleeve, said stop flutes providing a means for manual partial rotation of said pencils in said sleeve, said grip plates having inward projecting gripping edges for forming indentations on the hexagonal ridges of said pencils during said rotation, said stop flutes and said grip plates against said indentations providing a means for gripping and holding said pencils together within said coupling.

2. In a pencil coupling, the combination of a tubular sleeve having internal stop flutes extending from end to end thereof, two thin grip plates attached to the ends of said sleeve, said sleeve with said flutes and said grip plates providing a means for the manual insertion and rotation to grip and hold two hexagonal pencils together within said coupling.

3. In a pencil coupling, the combination of, a tubular sleeve having internal stop flutes extending from end to end thereof, two grip plates fastened to the ends of said sleeve, said flutes and said grip plates coordinately arranged with respect to said sleeve for providing a means to hold the ends of two hexagonal pencils together so that each pencil is independently gripped in said coupling.

4. A pencil coupling consisting of, a tubular sleeve, two grip plates, said sleeve having internal stop flutes extending from end to end thereof, said grip plates having inward projecting gripping edges and being attached to the ends of said sleeve, said stop flutes and said grip plates coordinately fixed with said sleeve to provide for the manual insertion and rotation of two hexagonal pencils abutting end to end within said coupling, said stop flutes providing a means for the manual rotation of said pencils to approximately thirty degrees (30°) within said sleeve, said grip plates providing a means for forming indentations on the hexagonal ridges of said pencils during said rotation, said indentations providing a means for holding said pencils within said coupling.

5. A pencil coupling, comprising, a tubular sleeve and two grip plates, said sleeve having inwardly projecting stop flutes extending from end to end thereof, said grip plates having inwardly projecting gripping edges and being attached to the ends of said sleeve, said stop flutes providing a means for the manual rotation of two hexagonal pencils to approximately thirty degrees (30°) within said sleeve, said grip plates providing a means for forming indentations on the hexagonal ridges of said pencils during said rotation, said stop flutes and said grip plates against said indentations providing a means for gripping and holding said pencils together within said coupling.

6. In a pencil coupling, the combination of a stack of laminated metal plates of two forms and all fastened together, one form of said metal plates being stacked together into a tubular sleeve having internal stop flutes extending from end to end thereof, the other form being two thin plates attached to the ends of said sleeve, said thin plates being grip plates for forming indentations on the hexagonal ridges of two pencils, said indentations providing a means for holding said pencils in said sleeve.

7. In a pencil coupling, the combination of, a stack of laminated plates all fastened together to form said coupling, said plates stacked to form one center section and two end sections, said center section forming a sleeve for said coupling, said end sections forming grip plates for said coupling, said sleeve having internal stop flutes extending from end to end thereof, said grip plates having inwardly projecting gripping edges for forming indentations on the ridges of two hexagonal pencils in said coupling, said stop flutes and said grip plates against said indentations providing a means for gripping and holding said pencils together within said coupling.

8. In a pencil coupling, the combination of a tubular sleeve and at least two end grip plates all fastened together to make said coupling, said sleeve having inwardly projecting stop flutes extending from end to end thereof, said stop flutes providing a means for the manual rotation of two hexagonal pencils to approximately thirty degrees (30°) in said sleeve, said grip plates having inward projecting gripping edges for forming indentations on the hexagonal edges of said pencils, said indentations providing a means for gripping and holding said pencils in said coupling.

HAROLD SWANSON.

REFERENCES CITED

The following references are of record in the file of this patent:

UNITED STATES PATENTS

| Number | Name | Date |
|---|---|---|
| 2,049,810 | Kusa | Aug. 4, 1936 |